(12) United States Patent
Castellani et al.

(10) Patent No.: US 7,171,620 B2
(45) Date of Patent: Jan. 30, 2007

(54) SYSTEM AND METHOD FOR MANAGING DOCUMENT RETENTION OF SHARED DOCUMENTS

(75) Inventors: Stefania Castellani, Meylan (FR); Boris Chidlovskii, Meylan (FR)

(73) Assignee: Xerox Corporation, Stamford, CT (US)

( * ) Notice: Subject to any disclaimer, the term of this patent is extended or adjusted under 35 U.S.C. 154(b) by 508 days.

(21) Appl. No.: 10/201,717

(22) Filed: Jul. 24, 2002

(65) Prior Publication Data

US 2004/0019846 A1 Jan. 29, 2004

(51) Int. Cl.
*G06F 17/00* (2006.01)
*G06F 7/00* (2006.01)
*G06F 17/30* (2006.01)

(52) U.S. Cl. ............ 715/538; 715/511; 715/530; 707/5; 707/200

(58) Field of Classification Search ........ 715/538, 715/511, 530; 707/200, 5
See application file for complete search history.

(56) References Cited

U.S. PATENT DOCUMENTS

| | | | | |
|---|---|---|---|---|
| 5,583,763 | A | 12/1996 | Atcheson et al. | 364/364 |
| 5,749,081 | A | 5/1998 | Whiteis | 707/395 |
| 5,926,812 | A * | 7/1999 | Hilsenrath et al. | 707/5 |
| 6,041,311 | A | 3/2000 | Chislenko et al. | 705/395 |
| 6,321,179 | B1 | 11/2001 | Glance et al. | 702/702 |
| 6,327,590 | B1 | 12/2001 | Chidlovskii et al. | 702/702 |
| 6,339,786 | B1 * | 1/2002 | Ueda et al. | 709/217 |
| 6,389,372 | B1 | 5/2002 | Glance et al. | 702/705 |
| 6,473,753 | B1 * | 10/2002 | Katariya et al. | 707/4 |
| 6,526,440 | B1 * | 2/2003 | Bharat | 709/219 |
| 6,799,176 | B1 * | 9/2004 | Page | 707/5 |
| 2002/0116401 | A1 * | 8/2002 | Kashito et al. | 707/200 |
| 2002/0165853 | A1 * | 11/2002 | Gogolak | 707/3 |
| 2002/0199024 | A1 * | 12/2002 | Givoly et al. | 709/248 |
| 2003/0233345 | A1 * | 12/2003 | Perisic et al. | 707/3 |
| 2004/0002973 | A1 * | 1/2004 | Chaudhuri et al. | 707/7 |
| 2004/0025113 | A1 * | 2/2004 | Penke et al. | 715/511 |
| 2005/0216443 | A1 * | 9/2005 | Morton et al | 707/3 |

OTHER PUBLICATIONS

U.S. Appl. No. 09/596,070, entitled "Recommender System And Method for Generating Implicit Ratings Based On User Interactions With Handheld Devices".

U.S. Appl. No. 09/465,561, entitled "Method For Monitoring And Encouraging Community Activity In A Networked Environment".

U.S. Appl. No. 09/305,845, entitled "System For Providing Document Change Information For A Community Of Users".

(Continued)

*Primary Examiner*—Doug Hutton
*Assistant Examiner*—Chau Nguyen
(74) *Attorney, Agent, or Firm*—Oliff & Berridge, PLC (57) ABSTRACT

The visibility of shared documents in a collaborative recommender system is managed by analyzing both the document's substance and user actions that are performed on the document. The document's substance includes both metadata and content. User actions include both user ratings and semantic actions. The visibility of the shared documents is updated when either a user action or an event occurs.

26 Claims, 5 Drawing Sheets

OTHER PUBLICATIONS

U.S. Appl. No. 09/746,917, entitled "Remember System And Method".

E. Adar, D. Karger and L. A. Stein, "Haystack: Per-User Information Environments", in Proc. of CIKM Nov. 2-6, 1999, Kansas City, MO, 1999.

N. Glance, D. Arregui, and M. Dardenne, "Knowledge Pump: Supporting the Flow and Use of Knowledge", in Springer Verlag, Borghoff, U. and Pareschi, R. (Eds), Information Technology for Knowledge Management, 1998.

N. Glance et al., "Making Recommender Systems Work for Organizations"in the Proceedings of PAAM, 1999.

B. A. Huverman and M. Kaminsky, "Beehive: A System for Filtering and Sharing Information", Xero; Palo Alto Research Center, 1996.

P. Resnick, and H. Varian editors, "Special Issue on Recommender Systems". Communications of the ACM, 40(3): 56-58, 1997.

B. M. Sarwar, J. A.Konstan, Al Borchers, J. Herlocker, B. Miller, and J. RiedL "Using filtering agents to improve prediction quality in the GroupLens research collaborative filtering system", in Proc. ACM Conf. on Computer Supported Cooperative Work (CSCW), 1998.

\* cited by examiner

SYSTEM AND METHOD FOR MANAGING DOCUMENT RETENTION OF SHARED DOCUMENTS

BACKGROUND OF INVENTION

The present invention relates to the field of knowledge management, and in particular to the field of organization of documents in a community space over time by controlling document aging information in a document management system.

A document management system generally is a document repository that users can access to add or retrieve a given document. A recommender system is a well-known form of a document management system and embodies the concept of knowledge sharing in communities of people by organizing the community work around documents relevant to specific topics or subjects. Some recommender systems are even able to provide personalized recommendations that take into account similarities between people based on their user profiles.

An example of a recommender system is Knowledge Pump developed by Xerox Corporation. Knowledge Pump provides users with personalized recommendations for things to read. When users sign up, they join communities of people with similar interests. Profiler agents track and map each user's interests, learning more about the person each time (s)he uses Knowledge Pump. A recommender agent finds matches between new items and user preferences, automatically sending relevant information to people as it is found. For more background concerning the Knowledge Pump, reference is made to the article "Making Recommender Systems Work for Organizations" by Glance et al., published in the Proceedings of PAAM, 1999.

Typically, knowledge sharing in a community system is focused on the filtering and the recommendation of incoming documents to users. The decision on recommendation is generally based on content or collaborative (i.e., social) filtering. These two methods of filtering are complementary. The content filtering method is based on the analysis of document content and the evaluation of document similarity (i.e., methods relating to information retrieval). In contrast, the collaborative filtering method is based on existing user ratings for documents and deriving user interest correlations in order to predict user ratings for future documents.

While both filtering methods address the problem of input document filtering, systems are not known to help users determine how long to retain documents after making recommendations (i.e., inside the community or user working space). That is, when the number of documents in a community grows, a recommender system faces the problem of "ecology", documents once recommended and referred to by others may keep or lose their value over time, thus gradually transforming the community into a collection of loosely-related documents, with many that may be irrelevant, obsolete or outdated.

Also, while techniques for enriching documents with additional associations are also known, it is believed they are single-user oriented and do not concern community ecology. A typical example is "Haystack" which adapts to a user by using automated data gathering through active observation of user activity to customize a single user's information collection and to adapt to individual query needs of the user. More details concerning Haystack are disclosed in the article "Haystack: Per-User Information Environments", by E. Adar, D. Karger and L. A. Stein, In Proc. of CIKM 1999, Nov. 2–6, Kansas City, Mo.

In order to provide an improved quality of services delivered to users, it would be advantageous to provide community support systems that organize documents better than simple collections, by enriching documents therein with a set of additional associations (e.g., semantic, temporal, etc.). It would further be advantageous if these additional associations could then be used to improve the prediction of document aging information in collaborative information systems such as Knowledge Pump.

SUMMARY OF INVENTION

In accordance with the present invention, there is provided a method, and system and article of manufacture therefor, for managing retention of a document submitted to a recommender system. A visibility value is defined that estimates the document's importance to users of the recommender system. Over a time interval, a determination is made as to: (a) whether higher quality siblings of the document exist in the recommender system, and (b) whether a user action or event occurred. The visibility value of the document is adjusted in the recommender system as a function of: (a) a user action when the user action occurs over the time interval, and (b) the document's substance when an event occurs over the time interval. The visibility value of the document is decreased in the recommender system as a function of the document's substance when no user action or event occurs over the time interval.

The document is removed from the recommender system when: (a) higher quality siblings of the document exist in the recommender system, or (b) the visibility value of the document in the recommender system is less than a threshold value.

BRIEF DESCRIPTION OF DRAWINGS

These and other aspects of the invention will become apparent from the following description read in conjunction with the accompanying drawings wherein the same reference numerals have been applied to like parts and in which.

DETAILED DESCRIPTION

1. Operating Environment

Figure 1:
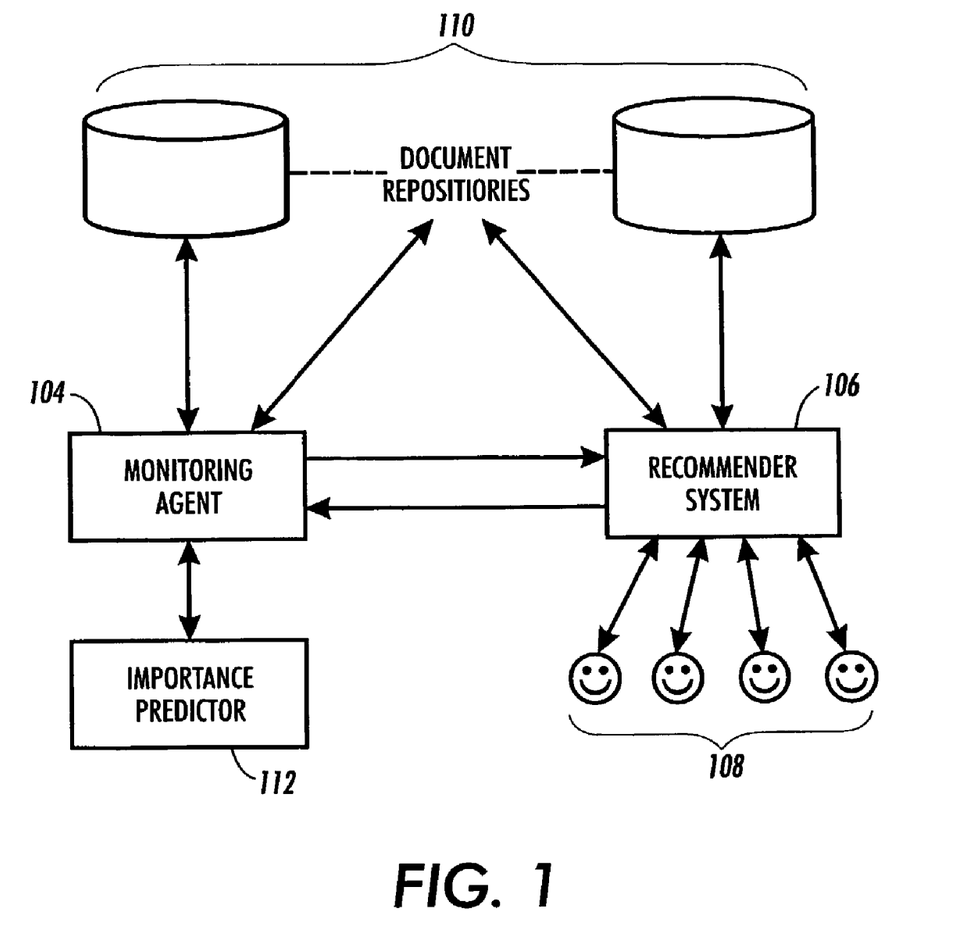
FIG. 1 illustrates an example operating environment for the present invention.

FIG. 1 illustrates an example of an operating environment for performing the present invention in which interactions between a monitoring agent 104, a recommender system 106, users 108 and document repositories 110 are shown. The recommender system 106 provides recommended documents to the users 108. To perform this function, the recommender system 106 communicates with the document repositories 110. The document repositories 110 typically reside on a network such as the Internet.

In operation, the users 108 of the recommender system 106 elect to be informed about changes to the recommended documents. When this occurs, the recommender system 106 registers the recommended documents with the monitoring agent 104. Upon detecting a document change, the monitoring agent 104 reports back to the recommender system 106 information about the change. The recommender system then notifies the users of the change. The user may then provide feedback related to the change.

Figure 2:
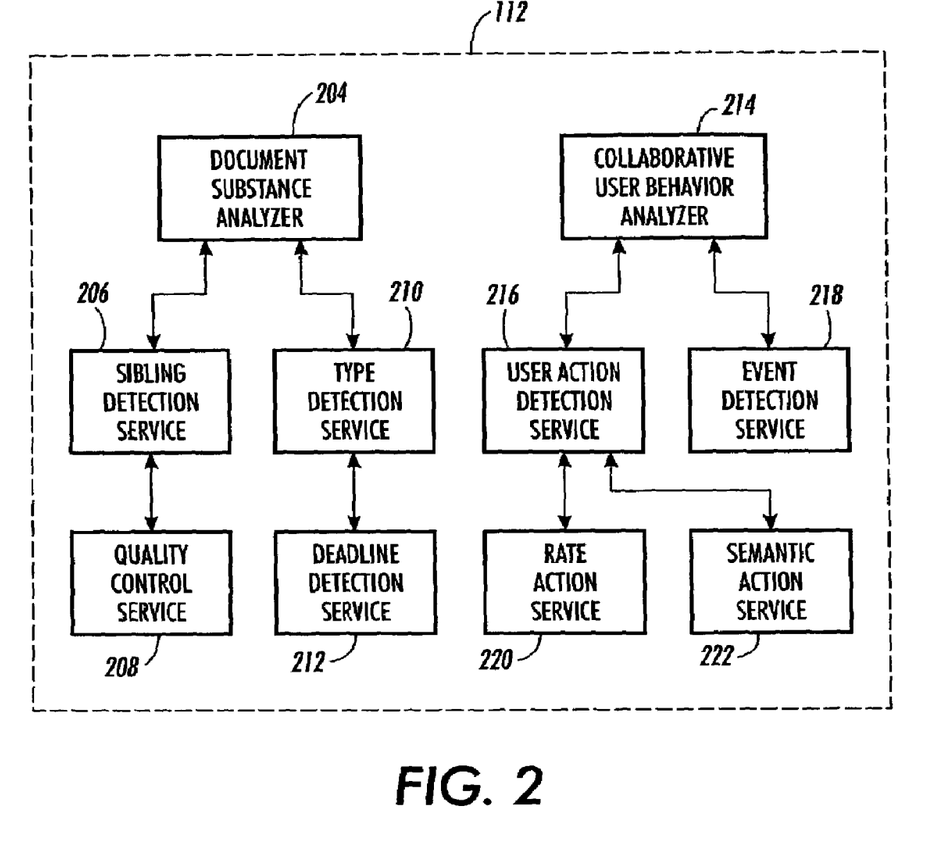
FIG. 2 illustrates the elements of the importance predictor shown in FIG. 1.

In addition, the monitoring agent 104 communicates with an importance predictor 112 shown in detail in FIG. 2. The importance predictor 112 provides the monitoring agent 104 and the recommender system 106 with predictions of document importance over the life of a document submitted by a user 108 to the recommender system 106. As detailed in FIG. 2, the importance predictor 112 includes dual analysis of a document with a document substance analyzer 204 and a document collaborative behavior analyzer 214 to predict document importance over time, the details of which are discussed below.

2. Document Importance Prediction

According to the present invention, a method for determining a document visibility history is described which allows better organization of documents inside a community working space in order that knowledge sharing and reuse may improve community ecology. The community ecology task includes: 1) understanding the relationships among documents in the community working space; 2) observing users consumption of documents; and 3) assisting users in such actions by providing recommendations.

As shown in FIG. 2, two processes for determining document importance form part of the importance predictor 112. The first process 204, called "substance document importance prediction" and described in section 2.1 below, is based on the analysis of document content and metadata. The second process 214, called "collaborative document importance prediction" and described in section 2.2 below, is based on the collaborative analysis of user actions on documents. User actions relate to semantic actions, such as a "save" command, performed by a user to a document in a recommender system 106. These two processes are combined to provide improved community ecology by predicting document importance over time, as described in section 2.3 below.

2.1 Importance Prediction Using Document Substance

Substance document importance prediction, which is performed by a document substance analyzer 204 shown in FIG. 2, improves community ecology by analyzing the substance of documents, which includes content and metadata.

The substance document importance processing of document metadata involves the use of metadata extraction methods for finding certain patterns in documents, defined herein as "implicit" metadata, that enrich "explicit" metadata of documents (e.g., URL (Universal Resource Locator), title, author, creation date, abstract, source, comments, etc.). Examples of implicit metadata extraction methods include sibling detection and type detection.

The document substance analyzer 204 communicates with a sibling detection service 206 that detects redundant or previously submitted entries (i.e., identical or similar entries) by the users of a recommender system. Examples of sibling entries are entries with very similar content and/or explicit metadata. Duplicate or similar recommendations are frequent in recommender systems and often caused for the following reasons: (a) a user may have not examined every available recommendation; (b) a user may have previously seen a recommendation and removed it for lack of interest in it at that time; and (c) similar recommendations may contain different explicit metadata.

A quality control service 208, communicating with the sibling detection service 206, estimates the probability that one recommendation is a duplicate of another recommendation by computing the similarity of the explicit metadata of recommendations identified as siblings. If the probability is above a predetermined threshold, the quality control service suggests to the users of the community to remove the duplication.

Sibling detection can be used to influence the importance of a document recommended to a recommender system. For example, if it is highly probable that a newly recommended document is a sibling to a previously recommended document, either the newly recommended document or the previously recommended document is removed from the recommender system. Such sibling detection directly influences the ecology of the recommender system by eliminating redundant entries.

A type detection service 210 detects document types. Any document in the community is characterized by certain features (e.g., length, format, etc.) and by its explicit metadata. Additionally, it is important to classify documents into one of a plurality of semantically-rich types, such as: news, sites (e.g., home pages), results of search, stock values, project white papers, research papers, etc. Documents of different types have different expected lifetimes, some types (e.g., news, results of search, stock values) become obsolete or outdated before others (e.g., white papers and research papers). Therefore, the detection of the type of a document is helpful when predicting the lifetime of the importance of a document.

A type service will determine the type of newly introduced documents by using certain feature/metadata patterns, for example, CGI-formed (Common Gateway Interface) URLs for search results, specific keywords in titles/bodies for news and stock options, presence of bibliography for research papers etc. Such patterns can be indicated by users/administrators or induced by the system from a corpus of samples.

In one embodiment, documents are classified and associated by a number of factors, including types, metadata, deadlines, etc., as is generally known, (e.g., from document archiving in large organizations). In addition two complementary document importance prediction processes are used to accomplish document classification by obtaining data concerning a given document from at least two different sources. By comparing these data to analyze the document, a document visibility history is determined indicating the document importance over time of a given document thus resulting in better knowledge sharing.

A deadline detection service 212, forming part of the type detection service 210, detects documents that are outdated or obsolete. The deadline detection service may explicitly detect whether a document potentially has a long-life or a short-life span by identifying expiry data specified in the content or explicit metadata of the document (e.g., a report indicating the year or project goals such as "2000 trip report"). Using identified expiry data, the type detection service can then classify documents with an explicit deadline in the past as obsolete or outdated and suggest to the community user to remove those recommendations. Type detection with deadline detection thus has an indirect influence on community ecology by not immediately removing recommended documents.

2.2 Document Importance Prediction Using Collaborative User Behavior

Collaborative document importance prediction refers to improving community ecology by analyzing user work practices, then generalizing and sharing the practices among all community members. User participation in collaborative importance prediction can be unidirectional (i.e., a user disallows the system to recommend certain actions) or bi-directional (i.e., a user allows the system to take advantage of the user's personal work with documents).

As shown in FIG. 2, a collaborative user behavior analyzer 214 that communicates with a user action detection service 216 and an event detection service 218 performs collaborative document importance prediction. The event detection service 218 detects when events occur during the life of a document that don't result from immediate user actions. An event occurs for example when the lifetime of a document (i.e., $LT_D$) reaches the average lifetime of similar document types (i.e., $LT_{avg}$). As discussed in more detail below, the lifetime of a document is a function of the substance of a document. Alternatively, an even occurs when a user predefines a deadline (e.g., a deadline to update a document) or postpones a decision (e.g., a decision to remove a document).

Collaborative importance document prediction is based on evaluating user actions, at 216, that include analysis of user ratings, at 220, and semantic actions, at 222, performed when users consume documents in a recommender system. More precisely, conventional collaborative filtering, based on evaluating documents by providing ratings, is combined with other ways users consume documents. Accordingly, rate action service 220 analyzes a rating action by a user. This provides a first kind of user action on a document called the rate action "r". The rate action concerns contributions by users to a document rating in a community of the recommender system.

In addition the rate action service 220, the consumption of documents by users in a recommender system is analyzed by semantic action service 222. The semantic action service 222 evaluates semantic actions performed by users on a document. Semantic actions may include, for example, the commands: save and remove. The save command involves the registering of a document as important (i.e., persistent interest). The remove command involves the identification a document as irrelevant (i.e., of no or little interest). In an alternate embodiment, additional semantic actions (e.g., archive, print or mail) can be used in measuring collaborative document importance by semantic action service 222.

The rate and user actions are used by the analyzer 214 to represent explicit feedback on document importance in the long term by influencing a document's visibility in the recommender system 106. For example, save actions are considered positive feedback on how long a document will remain important for users thus leading to an increase of the document visibility, whereas remove actions provide negative feedback, lowering a document's visibility.

Accordingly, the importance of a document is measured using parameters that measure user rating actions and semantic actions on documents. The value of these parameters is a function of user-to-user action correlations and sharing recommendations of documents.

2.3 Document Importance Prediction Using Collaborative User Behavior and Substance Substance document importance prediction and collaborative document importance prediction are combined to predict how long a document will remain important (i.e., visible) for a user. The visibility history approach is influenced by the following factors: (a) user collaboration (e.g., highly rated and saved documents are forgotten slower than removed documents); and (b) document substance (e.g., certain types of documents are forgotten slower than other types documents). More specifically, the evolution of the importance of a document is modeled by two parameters: a visibility value, denoted by $V_D$, describing the current visibility value of a document; and a forgetfulness value, denoted by $F_D$, that describes the tendency of the visibility.

Generally, visibility values $V_D$ are in a range from a minimum value "minValue" to a maximum value "maxValue" (e.g., in the [0:100] range), while forgetfulness values $F_D$ are in a range from a minimum value "minValue" to a maximum value "maxValue" (e.g., in the [0:10] range). More visible documents are assumed to be more important for the user and less visible documents appear less important. Collaborative importance prediction is primarily used to determine the visibility parameter, but also to determine the forgetfulness parameter, using analysis of user action. Document type detection that forms part of the substance importance prediction is also used to determine the forgetfulness parameter. As a general rule, all documents lose their importance with time though at a different rate. That is, as the visibility value of a document changes, the document visibility history of the document changes.

Figure 3:
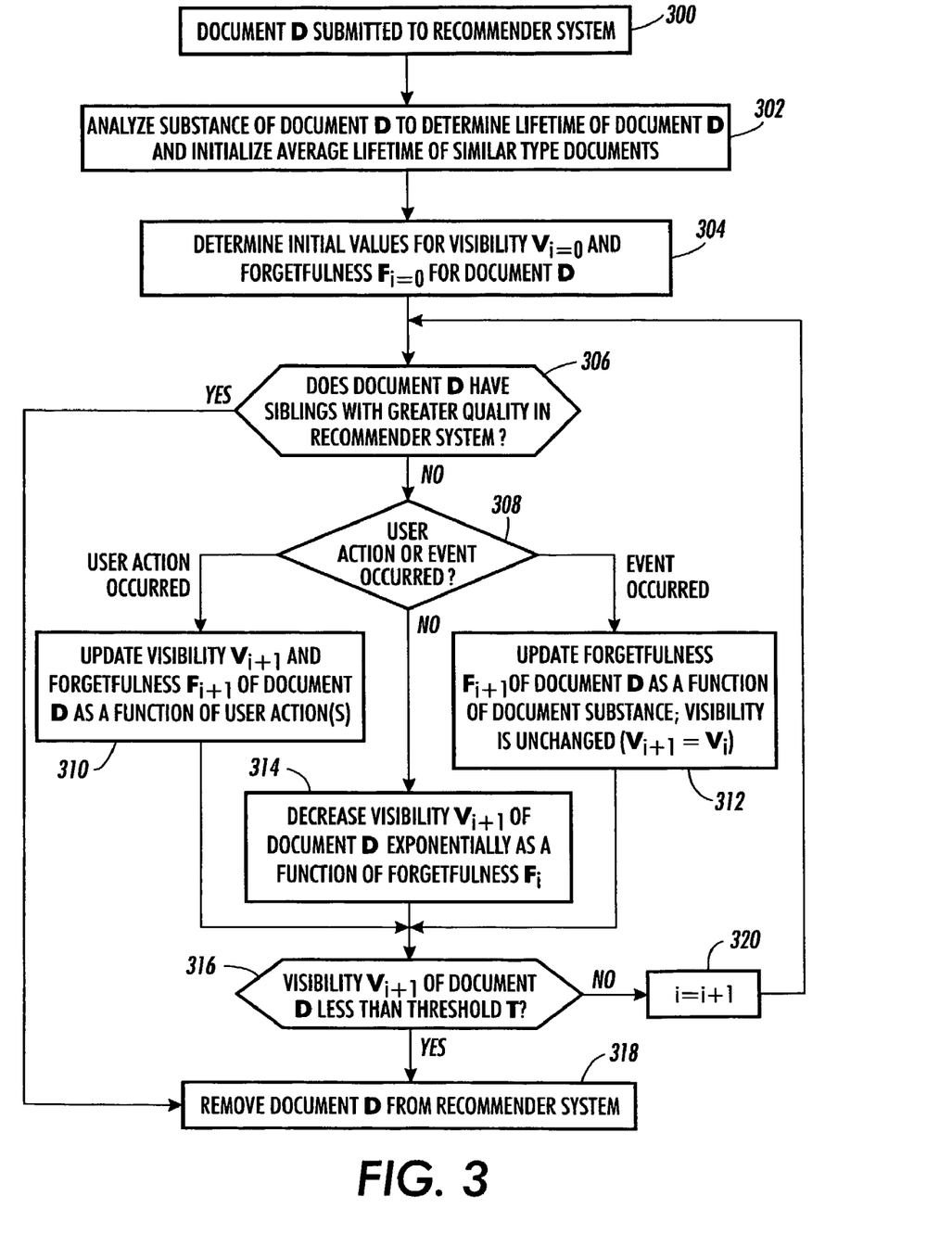
FIG. 3 is a flow diagram depicting one method for predicting the importance of a document over time using a visibility parameter V and a forgetfulness parameter F of a document D.

FIG. 3 is a flow diagram depicting one method for predicting the importance of a document over time using a visibility parameter V and a forgetfulness parameter F of a document D. Initially at 300, a document D is submitted to the recommender system 106 by a user 108 at time $T_0$.

At 302, the substance of the document D is analyzed to compute the lifetime value $LT_D$ of the document D. This value in turn is used to initialize an average lifetime value $LT_{AVG}$ for documents of the identified type. The computation of $LT_D$ and $LT_{AVG}$ is discussed below with reference to Table 2.

Further at 304, initial values are computed for visibility parameter $V_0$ and forgetfulness parameter $F_0$ for the document D. These intial values are defined using scaled values of user-to-user correlation determined with rankings performed in the recommender system to documents of similar substance.

Subsequently at 306, the document D is examined by the sibling detection service 206 to detect siblings and assess sibling quality. If a sibling is found in the recommender system of greater quality at 306, then the document is removed from the system at 318; otherwise, importance prediction continues at 308.

At 308 a determination is made as to whether a user action or an event occurred. If a user action occurred at 308 (e.g., rating, saving and removing D), the visibility parameter $V_{i+1}$ and the forgetfulness parameter $F_{i+1}$ of a document D are reevaluated at 310 using parameters values $V_i$ and $F_i$ as shown in Table 1.

TABLE 1

| Action | V | F |
|---|---|---|
| Rate | $V_{i+1} := V_i + (r - r^{avg}) \alpha$ | $F_{i+1} := F_i + (r - r^{avg}) \beta$ |
| Save | $V_{i+1} := V_i + (100 - V_i) \alpha$ | $F_{i+1} := F_i + (10 - F_i) \beta$ |
| Remove | $V_{i+1} := V_i \alpha$ | $F_{i+1} := F_i \beta$ |

In Table 1, r is a user's rating of the document D, $r^{avg}$ is the average value of document ratings by the user (e.g., for a set of documents in a given community); and $\alpha, \beta \in [0,1]$ are tuning coefficients, which characterize the reactivity of the system (i.e., preferred speeds at which a system responds to actions taken by users).

Alternatively, if an event occurs at 308 (e.g., the lifetime of a document D reaches the average lifetime for the documents of type T, D∈T), the forgetfulness parameter $F_{i+1}$ of a document D is reevaluated using parameter value $F_i$ as shown in Table 2.

TABLE 2

| Event | V | F |
|---|---|---|
| $LT_D \geq LT_{avg}$ | — | $F_{i+1} := F_i \beta$ |

In table 2, $\beta \in [0,1]$ is a tuning coefficient, which characterizes the reactivity of the system; and the average lifetime of a document $LT_{avg}$ of document type T is an average over lifetimes of all documents of type T evaluated during a certain period of time (e.g., submitted to the recommender system since time $t_x$ until present). The average lifetime of a document $LT_{avg}$ can be represented as follows:

$$LT_{avg} = avg(LT_D | D, t_s > t_x),$$

where the lifetime $LT_D$ of a document D is estimated from the history of document "usage" by all users as follows:

$$LT_D = (t_l - t_s)(1 + S(N_r + N_s)/N_m),$$

where $t_s$ is the time of submission of the document D to the recommender system, $t_l$ is the time of the last rating, saving or removal of the document by users, $N_r$, $N_s$, $N_m$ are total numbers of document ratings, savings and removals by users, respectively, and S is a scale ratio.

At 314, when no user action or event occurred at 308, the visibility parameter V of a document D is evaluated between two actions or events by assuming that the last action took place at time $t_0$, when the visibility and forgetfulness parameters were initialized as $V_0$ and $F_0$, respectively. At any time t (i.e., t>$t_0$), the value of the forgetfulness parameter remains unchanged (i.e., F=$F_0$) while the visibility V of a document is said to decrease exponentially as follows:

$$V = V_0 e^{-F_0(t-t_0)S},$$

where V, $V_0 \in [0,100]$, $F_0 \in [0,10]$, and S is a scale ratio.

At 316, if the visibility V of the document D is less than a predetermined threshold visibility value T, then the document D is removed from the recommender system at 318; otherwise, the time index (or interval) "i" is incremented at 320. The rate (i.e., the time elapsed between time increments) at which the time index is incremented depends on the particular capabilities and requirements of the recommender system. Once the time index is incremented, the process of predicting document importance continues at 306.

In an alternate embodiment, after updating visibility V at 310 and forgetfulness F at 310 and 312, visibility V is decreased as a function of forgetfulness F during the current time interval (i) before determining whether the visibility of the document D is less than the threshold visibility value T.

3. Example of Enhanced Document Importance Prediction

Figure 4:
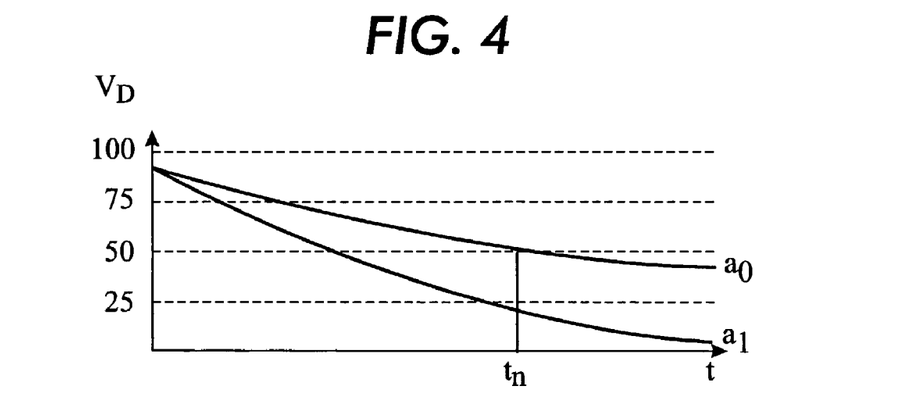
FIG. 4 illustrates a graph of different visibility decay levels $a_0$ $a_1$ for a document D in which time is represented along the x-axis and document visibility is represented along the y-axis.

Using the above prediction method, it is possible to predict the importance of documents for users of a recommender system by using a probabilistic measure that determines document visibility using exponential functions that may be adjusted depending on document forgetfulness. For example, FIG. 4 illustrates a graph of different visibility decay levels $a_0$ and $a_1$ for a document D in which time is represented along the x-axis and document visibility is represented along the y-axis. Assuming each parameter level has an equivalent initial value of the document visibility for the document, then at any point in time $t_n$ the probabilistic measure with the lower decay level $a_0$ will have greater visibility (i.e., a higher probability to remain relevant than at higher decay level $a_1$).

Figure 5:
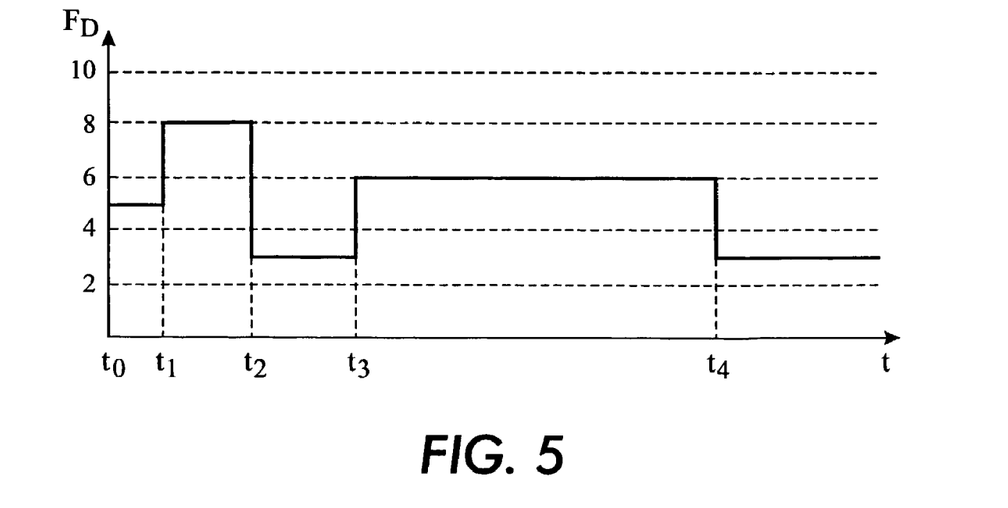
FIG. 5 illustrates a graph of the forgetfulness $F_D$ of a document D over time.

By using the above approach of obtaining a document visibility, a model of a document visibility history (i.e., the change of the document visibility indicator with time) can be illustrated. FIG. 5 illustrates a graph of the forgetfulness $F_D$ of a document D over time, while FIG. 6 illustrates a graph of the visibility $V_D$ of the document D over time, where time is represented along the x-axis and forgetfulness $F_D$ and visibility $V_D$ are represented along the y-axis, respectively.

Figure 6:
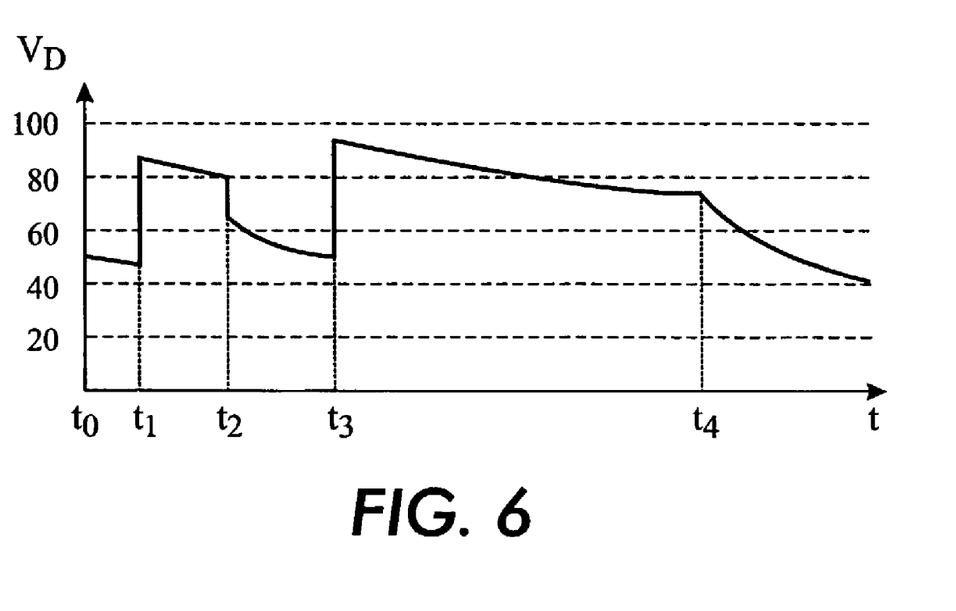
FIG. 6 illustrates a graph of the visibility $V_D$ of the document D over time.

In the graphs shown in FIGS. 5 and 6, bi-directional user participation is assumed. That is, all user actions on document D influence the document importance prediction in the community. Generally, FIGS. 5 and 6 show changes of $F_D$ and $V_D$ over a time period [$t_0$, t] in which user actions and/or events occur at times $t_1$, $t_2$, $t_3$, $t_4$. Those skilled in the art will appreciate that the values of $F_D$ and $V_D$ will very depending on the particular values computed for a particular document and the user actions and events associated with the document.

More specifically in FIGS. 5 and 6, at time t0 some community member(s) recommend document D to the recommender system using conventional methods of collaborative/content filtering. The importance predictor estimates the relevance of document D to the user by computing initial forgetfulness $F_D$ and visibility $V_D$ values. The importance predictor performs further processing to compute the initial lifetime value $LT_D$ of the document D; namely, the document type is determined to be "news" and no explicit deadline in found in document D, which is used to compute the initial lifetime of the document. Using these values, the system assigns an initial document visibility value $V_D$ as being 50 and an initial forgetfulness value $F_D$ as being 5 from for [0:10] range, with 10 corresponding to the slowest forgetfulness and highest importance.

At time $t_1$, the user reads the document D, and gives it a rating of 4, and postpones any saving, or removing action. As a result of the user action at time $t_1$, the document visibility $V_D$ rises to 88 and the value of $F_D$ rises to 8. At time $t_2$, another community user performs the action to remove the document D, decreasing the visibility $V_D$ to 65 and the forgetfulness $F_D$ to 3. At time $t_3$, the user revisits document D and saves it. This save action then increases the importance of the document, increasing visibility $V_D$ to 52 and forgetfulness $F_D$ to 6.

At time $t_4$, an event occurs at which the document lifetime $LT_D$ of document D reaches the average lifetime $LT_{avg}$ of documents of comparable type. When this event occurs the visibility $V_D$ does not change immediately, however, the forgetfulness $F_D$ decreases. This decrease in forgetfulness causes the decay level of visibility to change (e.g., from $a_0$ to $a_1$ as shown in FIG. 4), speeding the eventual removal of the document from the system. In general, document visibility tends to zero with time for any document, however, the more important a document the longer its removal from the system will take.

4. Miscellaneous

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The invention claimed is:

1. A method for managing retention of a document submitted to a recommender system, comprising:
    analyzing a document's substance to compute a lifetime of the document;
    defining a visibility value that estimates the document's importance to the users of the recommender system;
    determining over a time interval: (a) whether higher quality siblings of the document exist in the recommender system, and (b) whether a user action or an event has occurred;
    adjusting the visibility value of the document in the recommender system as a function of: (a) the user action when the user action occurs over the time interval, and (b) the document's substance when an event occurs over the time interval;
    decreasing the visibility value of the document in the recommender system as a function of the document's substance when no user action or event occurs over the time interval, the visibility value thereby decreasing continuously over the time interval within the computed lifetime; and
    removing the document from the recommender system when: (a) higher quality siblings of the document exist in the recommender system, or (b) the visibility value of the document in the recommender system is less than a threshold value.

2. The method according to claim 1, wherein the event occurs when the computed lifetime of the document reaches a computed average lifetime of documents in the recommender system having a document type representing the document.

3. The method according to claim 2, further comprising:
    identifying the document type representing the document by analyzing the document's substance;
    computing the lifetime of the document as a function of a number of user actions performed between a time when the document was submitted to the recommender system and a time when the last user action occurred; and
    computing an average lifetime of documents having the document type representing the document as an average of the computed lifetimes of the documents.

4. The method according to claim 1, wherein the visibility value is adjusted during a subsequent time interval that occurs after the time interval in which the event occurs.

5. The method according to claim 1, wherein the document's substance is analyzed by extracting document metadata providing time information about the document.

6. The method according to claim 1, wherein a user action is one of a user rating and a semantic action.

7. The method according to claim 6, wherein the semantic action is one of saving and removing the document from the recommender system.

8. The method according to claim 7, wherein the visibility value increases when the document is saved and decreased when the document is removed.

9. The method according to claim 1, wherein the visibility of the document is decreased exponentially as a function of the document's substance when no user action or event occurs over the time interval.

10. The method according to claim 1, further comprising:
    defining a forgetfulness value that describes a document's importance to users of the recommender system, the forgetfulness value being responsive to a user section or an event, wherein the visibility value is a function of the forgetfulness value.

11. The method according to claim 10, further comprising:
    adjusting the forgetfulness value of the document in the recommender system as a function of the document's substance.

12. The method according to claim 11, wherein the visibility value decreases exponentially as a function of the time interval and the forgetfulness value that is updated when the user action or the event occurs over the time interval, the time interval corresponding to a difference between the user action or the event that occurred most recently and a subsequent time.

13. A system for managing retention of a document submitted to a recommender system, comprising:
    means for analyzing a document's substance to compute a lifetime of the document;
    means for defining a visibility value that estimates the document's importance to the users of the recommender system;
    means for determining over a time interval: (a) whether higher quality siblings of the document exist in the recommender system, and (b) whether a user action or event occurred;

means for adjusting the visibility value of the document in the recommender system as a function of: (a) the user action when the user action occurs over the time interval, and (b) the document's substance when the event occurs over the time interval;

means for decreasing the visibility value of the document in the recommender system as a function of the document's substance when no user action or event occurs over the time interval, the visibility value thereby decreasing continuously over the time interval within the computed lifetime; and means for removing the document from the recommender system when: (a) higher quality siblings of the document exist in the recommender system, or (b) the visibility value of the document in the recommender system is less than a threshold value.

14. The system according to claim 13, wherein the event occurs when the computed lifetime of the document reaches a computed average lifetime of documents in the recommender system having a document type representing the document.

15. The system according to claim 14, further comprising:
means for identifying the document type representing the document by analyzing the document's substance;
means for computing the lifetime of the document as a function of a number of user actions performed between a time when the document was submitted to the recommender system and a time when a last user action occurred; and
means for computing an average lifetime of documents having the document type representing the document as an average of the computed lifetimes of the documents.

16. The system according to claim 13, wherein the visibility value is adjusted during a subsequent time interval that occurs after the time interval, in which the event occurs.

17. The system according to claim 13, wherein the document's substance is analyzed by extracting document metadata providing time information about the document.

18. The system according to claim 13, wherein a user action is one of a user rating and a semantic action.

19. The system according to claim 18, wherein the semantic action is one of saving and removing the document from the recommender system.

20. The system according to claim 19, wherein the visibility value increases when the document is saved and decreases when the document is removed.

21. The system according to claim 13, further comprising:
means for defining a forgetfulness value that describes a document's importance to users of the recommender system, the forgetfulness value being responsive to a user action or an event, wherein the visibility value is a function of the forgetfulness value.

22. The system according to claim 21, further comprising:
means for adjusting the forgetfulness value of the document in the recommender system as a function of the document's substance.

23. The system according to claim 22, wherein the visibility of the document decreases exponentially as a function of the document's substance, the time interval and the forgetfulness value when no user action or event occurs over the time interval, the forgetfulness value being updated when the user action or the event occurs over the time interval, the time interval corresponding to a difference between the user action or the event that occurred most recently and a subsequent time.

24. An article of manufacture, comprising:
a storage medium; and
program instructions stored on the storage medium for managing retention of a document submitted to a recommender system communicating with an importance predictor having a processor; the processor in executing the program instructions:
analyzing a document's substance to compute a lifetime of the document;
defining a forgetfulness value that describes a document's importance to users of the recommender system, the forgetfulness value being responsive to a user action or an event;
defining a visibility value that estimates the document's importance to the users of the recommender system, the visibility value being a function of the forgetfulness value;
determining over a time interval: (a) whether higher quality siblings of the document exist in the recommender system, and (b) whether the user action or the event occurred;
adjusting the forgetfulness value of the document in the recommender system as a function of the document's substance;
adjusting the visibility value of the document in the recommender system as a function of: (a) a user action when the user action occurs over the time interval, and (b) the document's substance when an event occurs over the time interval;
decreasing the visibility value of the document in the recommender system as a function of the document's substance when no user action or event occurs over the time interval, the visibility value thereby decreasing continuously over the time interval within the computed lifetime; and
removing the document from the recommender system when: (a) higher quality siblings of the document exist in the recommender system, or (b) the visibility value of the document in the recommender system is less than a threshold value.

25. The article of manufacture according to claim 24, wherein the program instructions further comprise:
defining a forgetfulness value that describes a document's importance to users of the recommender system, the forgetfulness value being responsive to a user section or an event, wherein the visibility value is a function of the forgetfulness value.

26. The article of manufacture according to claim 25, further comprising:
adjusting the forgetfulness value of the document in the recommender system as a function of the document's substance.

* * * * *